United States Patent [19]

Turbier et al.

[11] 4,091,061

[45] May 23, 1978

[54] METHOD FOR THE PRODUCTION OF MOULDINGS CONTAINING REINFORCING FIBRE TYPE FILLER

[75] Inventors: Paul Turbier, Plaisir; Laszlo Szekely, Bruyeres-le-Chatel, both of France

[73] Assignee: Engins Matra, Paris, France

[21] Appl. No.: 800,314

[22] Filed: May 25, 1977

Related U.S. Application Data

[63] Continuation of Ser. No. 592,940, Jul. 3, 1975, abandoned.

[30] Foreign Application Priority Data

Jul. 5, 1974 France .................................. 74 23519

[51] Int. Cl.² ................................................ B29G 3/00
[52] U.S. Cl. .................................. 264/40.5; 264/257; 264/271; 264/279; 264/328
[58] Field of Search ....................... 264/40.5, 257, 271, 264/279, 328

[56] References Cited

U.S. PATENT DOCUMENTS

| 2,847,712 | 8/1958 | Pollard | 264/328 X |
| 3,028,284 | 4/1962 | Reeves | 264/328 X |
| 3,137,750 | 6/1964 | Gringas | 264/328 X |
| 3,427,185 | 2/1969 | Cheatham | 264/257 X |
| 3,906,066 | 9/1975 | Barrie | 264/328 X |

FOREIGN PATENT DOCUMENTS

| 2,031,255 | 1970 | France | 264/328 X |
| 1,127,579 | 1962 | Germany | 264/328 |

*Primary Examiner*—Richard R. Kucia
*Attorney, Agent, or Firm*—Ostrolenk, Faber, Gerb & Soffen

[57] ABSTRACT

In a method of producing mouldings containing a thermoset binder and a fibre type filler, a fraction of the binder is injected into a heated mould while the mould parts are moving into their closure position and the remainder of the binder is injected after the mould is closed.

6 Claims, 2 Drawing Figures

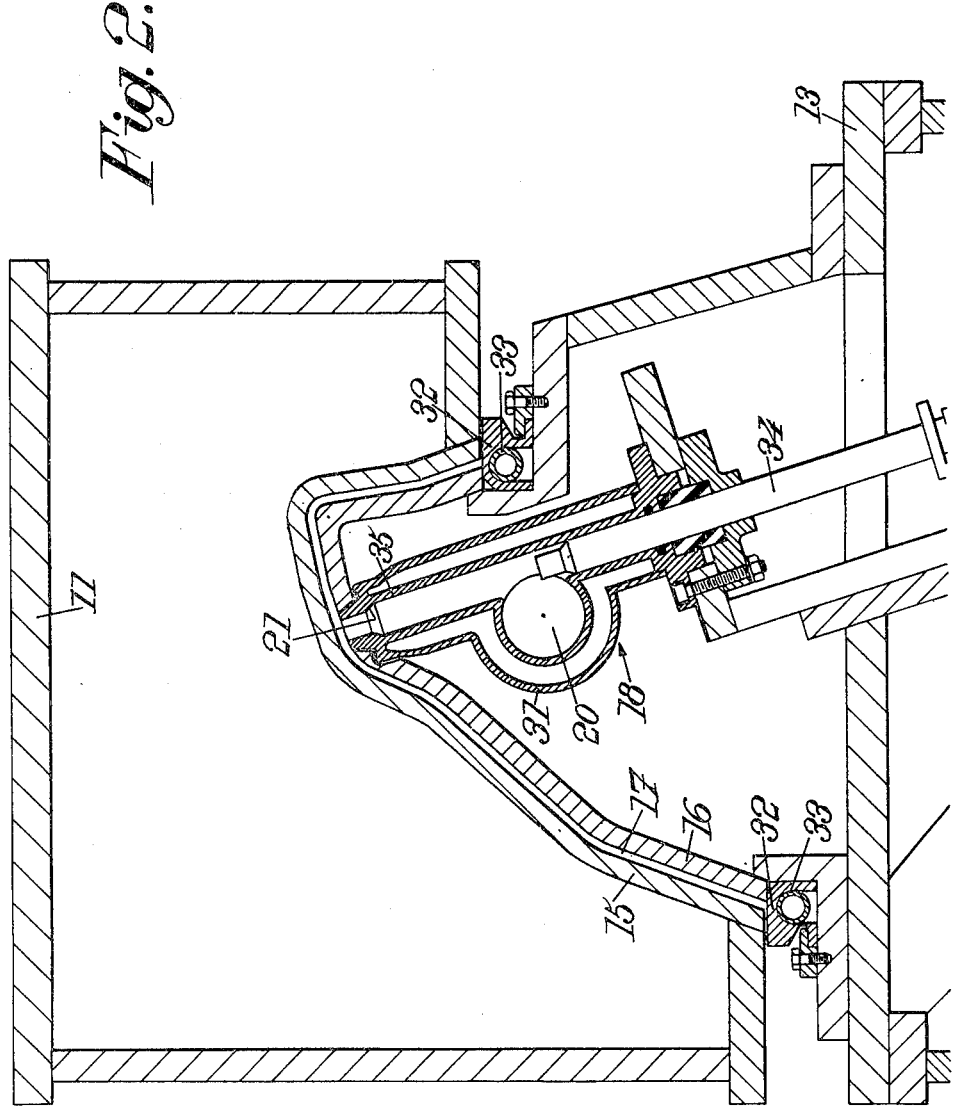

METHOD FOR THE PRODUCTION OF MOULDINGS CONTAINING REINFORCING FIBRE TYPE FILLER

This is a continuation of Application Ser. No. 592,940, filed July 3, 1975 now abandoned.

BACKGROUND OF THE INVENTION

This invention relates to the production of mouldings from a thermosetting binder (for instance a synthetic resin, such as a polyester or phenolic resin) reinforced by a fibre type filler. The filler is typically a glass fibre sheet, cushion or mat but may alternatively be in the form of textile cloths or even thin metal grids or expanded metal.

In a known method of producing injection mouldings, a filler mat is placed in a mould, the latter is closed, and then the resin is injected under high pressure into the mould. The method has disadvantages; in particular, the method is slow because the operations are all carried out in sequence; in addition, injection under high pressure is likely to move the filler from its proper position.

In another known method of producing reinforced resin components, the component constituents are disposed in a multi-part moulding machine and then kept under pressure during setting of the resin by a press in which the mould is placed. This method is slow, and renders the press necessary for a considerable time. Also, during distribution of the resin throughout the glass fibre mat forming the reinforcement, the pressure exerted by the press can cause a shift or loss of cohesion of said mat.

In an improved pressure moulding method (French patent specification No. EN 70 03120), the press is used only to pressurise the resin in the mould. The mould parts are then locked in a relative position such that the resin remains under pressure while the mould is in the press and then the mould is removed from the press which thus becomes available again. The moulding is left in the mould for the time required for complete setting. One of the causes of the slow cycle in prior art methods is thus removed, but the other disadvantages remain, since all the component constituents must be in place before mould closure starts.

SUMMARY OF THE INVENTION

It is an object of this invention to provide a method which is improved with respect to the prior art methods, particularly by obviating the above disadvantages to a considerable extent. According to the invention, there is provided a method of producing mouldings comprising a binder material and a fibre type filler, comprising the steps of locating the filler in a multi-part moulding machine comprising a stationary part and a movable part while the movable part is in a first, fully open position in which it is spaced apart from the stationary part by a maximum amount, heating said mould, moving said movable part from said first position to a second position in which said parts limit a moulding cavity of minimum volume, injecting a fractiononly of a predetermined quantity of a thermosetting binder material while the movable part is being moved to a second position where said parts define a closed mould cavity of minimum volume corresponding in shape to the moulding to be produced, and injecting the balance of said quantity while the movable part is retained in said second position.

That method may be considered as being a composite or hybrid method, since it combines pressure moulding (since the binder introduced before mould closure is distributed in the mould due to closing movements of the mould parts) and injection moulding (after the mould is fully closed).

The method can be used in a very wide range of applications. Although the binder is typically a thermosetting resin (in which case the mould is heated), a hydraulic binder or a binder polymerisable by the action of a polymerisation accelerator can sometimes be used. Similarly, although the fibre filler is typically a mat of non-woven mineral fibres (glass fibre, carbon fibres or even boron fibres) when resin is used, it is possible alternatively to use a textile mat adapted to impregnation or even a metal reinforcement in the form of a grid or expanded metal. When metal grids can be used because of the nature of the binder, the cost disadvantage associated to the requirement of shaping them before they are placed in the mould is balanced by the advantage of greater possibility of elongation under stress, which ensures a more even distribution of the stresses inside the moulding.

When the binder has a high setting speed as may be the case when a mixture of thermosetting resins and polymerisation accelerator is used, a single mould may be used which remains permanently on the machine during the entire production time. Alternatively, when a slow polymerisation binder is used, for example to obtain components which are required to be completely free of air inclusions and perfectly homogeneous (for example radomes or madomes, i.e. protection hoods for magnetic anomaly detectors), it is possible to provide a plurality of moulds per machine, each mould being provided with releasable means for locking together the mould parts. Thus, the machine is used only during pressure and injection moulding and then the mould is withdrawn from the machine which is thus immediately available again to receive another mould.

According to another aspect of the invention, there is provided a machine for performing the above-defined method, comprising a stationary platen and a movable platen each carrying a part of a multi-part mould, means for moving said movable platen between a first position where said parts are spaced apart by a maximum amount and a second position where said parts define a closed mould cavity of minimum volume corresponding in shape to the moulding to be produced, means for heating the parts of said mould, injector means operable to inject a predetermined quantity of thermosetting binder between said parts in one cycle, and means controlling said moving part and injector means for causing said moving means to move said movable platen from the first to the second position and said injector means to inject part of said quantity while said movable part is moved from an intermediate position to its second position and the balance of said quantity under increased pressure after said movable part has moved to its second position.

The invention will be better understood from the following description of a machine which is a specific embodiment thereof given by way of non-limitative example and is for the production of moulding of thermosetting resin reinforced by a mineral fibre mat. In the description, reference will be made to the accompanying drawings.

In the drawings:

FIG. 2 is a sectional view to an enlarged scale along a plane perpendicular to that of FIG. 1, showing the mould and an injector.

DESCRIPTION OF A PREFERRED EMBODIMENT

Figure 1:
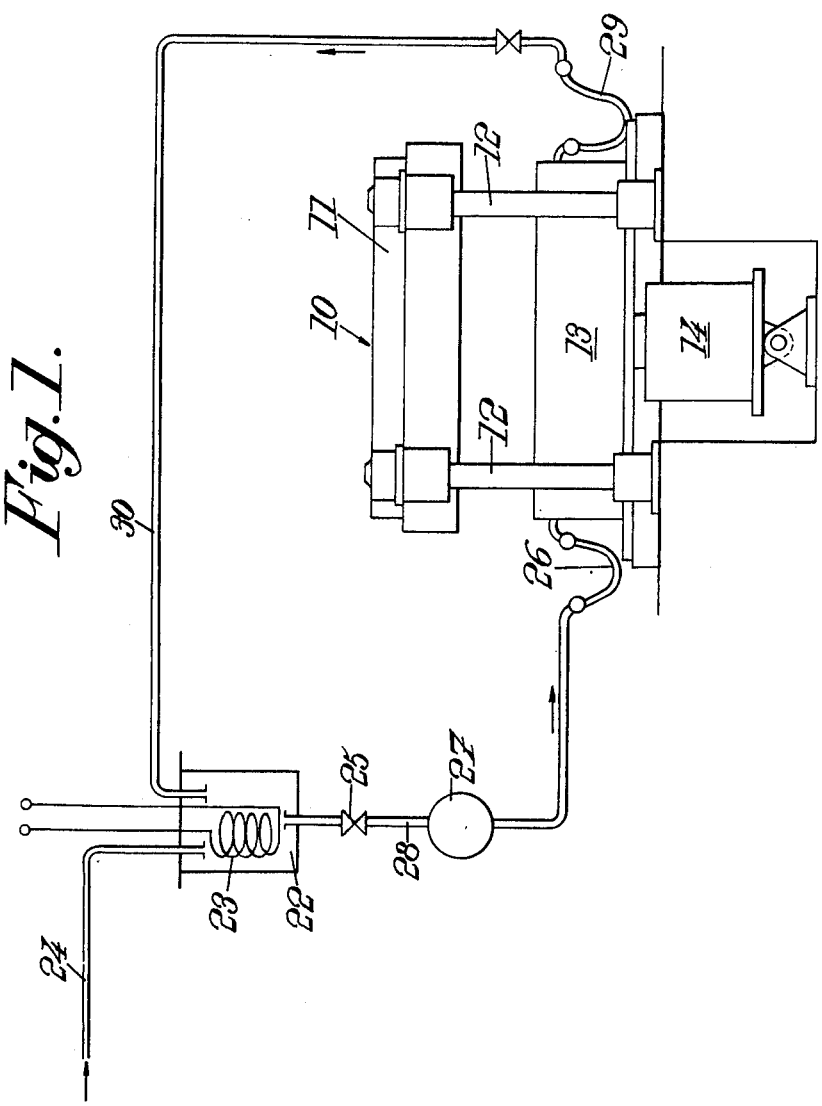
FIG. 1 is a general diagram of the main elements of the machine, shown in elevation, and of the associated components.

The apparatus illusrated diagrammatically in FIG. 1 comprises a machine 10 having a two-part mould. The top platen 11 of the machine is supported by columns 12 and stationary while the bottom platen 13 is movable by a fluid pressure jack 14 between a lower position in which it is shown and an upper position. In the latter position, the female part 15 of a mould borne by the platen 11 and the male part 16 of the mould borne by the bottom platen 13 cooperate to define a mould chamber or cavity 17. The male part 16 and the female part 15 are provided with heating elements (not shown) which may be in the form of oil conveying lines and are provided to hold the parts 15 and 16 at a temperature suitable for polymerisation of the resin (e.g. about 110° C when a polyester resin is used). The mould may of course be formed of more than two parts, particularly for producing mouldings of intricate shape.

The bottom platen 13 of the press carries one or more injectors 18. Where mouldings of elongate shape are being manufactured, for example motor-vehicle bumpers, a plurality of injectors 18 (only one is shown in FIG. 2) will typically be distributed along the length of the cavity limited by the mould parts in closed condition.

The injector or each injector 18 comprises a central body 35 adapted to be supplied with liquid resin via a feed conduit 20. A needle 34, shown in its open position in FIG. 2, is slidably mounted in the body 19 and its head is adapted to force out liquid resin and close an injector seat 21 during its forward stroke, when moved by actuating means (not shown).

The injectors are fed by a continuous flow system adapted to prevent local polymerisation and setting of the resin. This system comprises a storage tank 22 provided with a coil 23 for controlling the temperature and keeping it at a value low enough to prevent polymerisation of the resin in the tank (for example about 40° C in the case of polyester resins).

Tank 23 is provided with a conduit 24 for supplying fresh resin, for example at a temperature of 30° C, to replenish the resin as it is used. The resin is fed to the conduits 20 of the injectors 18 via a conduit 25 having a flexible connection 26 and a volumetric pump 27 and a stop and scavenging valve 28. The pump 27 keeps the resin in continuous flow, the resin in excess returning to the tank 22 via a flexible connection 29 and a rigid conduit 30.

To prevent the injectors from being heated by conduction from the mould to a temperature high enough for premature polymerisation of the resin to occur, the injectors are provided with a jacket 31 which limits a flow of cooling liquid (generally water) which keeps them at a temperature at which gelling is slow. Finally, the machine platens may be provided with a cooling circuit (not shown) so that they act as a heat sink.

Finally, to prevent resin losses due to leakage between the peripheral edges of the mould parts, the edges are provided with additional heating means. In the embodiment of FIG. 2, said means include two bars 32 provided with conduits 33 in which a heating fluid circulates in operation. These conduits 33 heat the bars to a temperature above that of the mould parts and sufficient to cause the resin coming into contact with the bars to gel rapidly.

Finally, the press is provided with means for synchronizing the working stroke of the bottom platen and operation of the injectors according to a predetermined sequence of operation. This sequence will now be described with reference to a specific embodiment of the invention.

It will be assumed that the machine is initially completely open, i.e. with the elements in the first positions shown in FIG. 1. A fibre mat intended to act as a reinforcement is first placed on the bottom mould. This may be typically a glass fibre mat; alternatively, synthetic or natural fibres may be used, e.g. nylon, flax or sisal.

When the mat is in position, the press operator initiates the operation of the machine. The control jack 14 is energized and moves up the lower platen at relatively high speed until the gap between the parts 15 and 16 of the mould is reduced to a given value corresponding, for example, in the case of a flat component, to approximately one and a half time the distance between them when the mould is fully closed. In this way, in the fully open position of the mould, when the bottom part is in its first position, there may be an appreciable distance between the parts 15 and 16 which facilitates the manual positioning of the reinforcing mat without excessively lengthening the time duration of the cycle.

From that time on, movement of the platen is continued at a slower speed; simultaneously, a predetermined fraction of the amount of resin intended for making the component is injected at low pressure (generally 2-5 bars). The resin is distributed throughout the cavity 17 as the mould parts 15 and 16 move together and impregnates the fibre mat which generally represents a fraction of about 30% of the total volume of the moulding.

Finally, when the part 16 has reached its second, i.e. final, position, the mould is closed and there is only a slight remaining clearance between the edges of the mould parts 15 and 16, the remainder of the resin quantity is injected at a pressure which may be increased during the end stage by moving the needle 20 from the position shown in FIG. 2 into its position resting on the seat 21. During this final stage, the injection pressure can rise to a very much greater value, for example as much as 50 bars approximately.

The parts are then retained in the closure position until the resin has hardened. The press platen 13 is then moved back and returned to its first position, so that the moulding can be removed.

The operation is generally controlled automatically by a sequencer which may be programmed for causing a high rate of pressurized fluid to be delivered to the jack 14 until it reaches an intermediate position (detected by a microswitch or another detector), then a lesser rate while the injectors are opened, and finally causes actuation of the injector needles after full closure of the mould has been detected.

As an example, the following sequence may be used:

Fast closing movement of the mould parts: 23 seconds.

Slow closing movement: 7 seconds, with injection of 60 to 80% of the resin during the last 5 seconds of closure (for example slightly less than 80%).

Injection of the remainder of the resin during the 3 seconds following closure.

Hardening :2½ minutes.

Rapid opening of the mold: 30 seconds.

Removal of the component and positioning of the fibre mat: 25 seconds.

As a general rule, the injector will be kept at a temperature about 50° C below the hardening threshold of the resin. In the case of polyester resin, for example, the injection may be carried out at 28°-30° C, the hardening threshold being about 80°-85° C. Heating of the mould will generally be continuous or permanent to give a rapid cycle.

The resulting method is a hybrid pressure moulding (the resin injected before closure is distributed under the pressure of the mould parts) and injection process which enables short time cycles to be obtained. The examplified method may be modified in numerous ways. More particularly, it is possible to provide the machine with a jack which locks the mould parts to one another so that the mould can be removed from the press if there is a long hardening time so that the press can be freed for another product. The products may themselves be of very different types: inter alia they can be household equipment (for example baths), boats, etc. Depending upon the required application, the resins may be of very different types. In addition to the polyester resins already mentioned, it is possible to use epoxy and phenolic resins having good resistance to heat, the only condition being that the viscosity of the resin before it is moulded should enable injection to be carried out; in practice, it should generally not exceed 8 poises.

We claim:

1. A method for producing mouldings from a thermosetting binder material and a fibrous type filling, comprising the steps of:

locating said filler in the stationary part of a multi-part moulding machine comprising said stationary part and a movable part while the movable part is in a first, fully open position in which it is spaced apart from the stationary part by a maximum amount, heating said mould, moving said movable part at a higher speed from said first position to an intermediate position, and a lower speed to a second position in which said parts limit a moulding cavity of minimum volume, corresponding in shape to the moulding to be produced, injecting a first fraction of between 60% and 80% said thermosetting binder material under a lower pressure while the movable part is being moved from said intermediate position to said second position and limits an open cavity, an injecting a second fraction of said thermosetting binder material sufficient to completely fill said cavity of minimum volume under a higher pressure while the movable part is retained in said second position.

2. A method according to claim 1, wherein the filler is a textile fibre cloth or mat.

3. A method according to claim 1, wherein the filler is a mineral fibre cloth or mat.

4. A method according to claim 1, wherein the filler is a metal grid.

5. A method according to claim 1, wherein said parts are connected to each other by releasable locking means after injection has been completed and the mould is then removed from the platens and left closed until the binder has completely set.

6. A method according to claim 1, wherein said fraction is injected under a pressure of from 2 to 5 bars and the balance under a pressure of approximately 50 bars.

* * * * *